United States Patent
Wang

(10) Patent No.: US 12,077,689 B2
(45) Date of Patent: Sep. 3, 2024

(54) FLEXIBLE PROTECTIVE FILM, CURVED DISPLAY, AND TERMINAL

(71) Applicant: HUAWEI TECHNOLOGIES CO., LTD., Guangdong (CN)

(72) Inventor: Fengping Wang, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 612 days.

(21) Appl. No.: 17/271,535

(22) PCT Filed: Aug. 31, 2018

(86) PCT No.: PCT/CN2018/103644
§ 371 (c)(1),
(2) Date: Feb. 25, 2021

(87) PCT Pub. No.: WO2020/042168
PCT Pub. Date: Mar. 5, 2020

(65) Prior Publication Data
US 2021/0185158 A1    Jun. 17, 2021

(51) Int. Cl.
B32B 7/12       (2006.01)
C09J 7/29       (2018.01)
H04M 1/02       (2006.01)

(52) U.S. Cl.
CPC ........... *C09J 7/29* (2018.01); *H04M 1/0269* (2022.02); *C09J 2433/006* (2013.01); *C09J 2467/006* (2013.01); *C09J 2469/006* (2013.01); *C09J 2475/006* (2013.01); *H04M 2201/38* (2013.01)

(58) Field of Classification Search
None
See application file for complete search history.

(56) References Cited

U.S. PATENT DOCUMENTS

| | | | |
|---|---|---|---|
| 9,634,270 B2* | 4/2017 | Liu | H10K 71/00 |
| 10,591,761 B2* | 3/2020 | Jee | C09D 183/06 |
| 11,014,342 B2* | 5/2021 | Song | B32B 27/40 |
| 2005/0249946 A1* | 11/2005 | Hsu | B32B 27/32 |
| | | | 428/354 |
| 2015/0261376 A1* | 9/2015 | Kim | G06F 3/04883 |
| | | | 345/173 |
| 2016/0033994 A1 | 2/2016 | Rothkopf et al. | |
| 2016/0150062 A1* | 5/2016 | Rhee | H04M 1/0266 |
| | | | 428/121 |

(Continued)

FOREIGN PATENT DOCUMENTS

| | | |
|---|---|---|
| CN | 105176370 A | 12/2015 |
| CN | 105280836 A | 1/2016 |

(Continued)

*Primary Examiner* — Tuan A Tran
(74) *Attorney, Agent, or Firm* — WOMBLE BOND DICKINSON (US) LLP

(57) ABSTRACT

A flexible protective film is provided and is used to protect a curved display. The flexible protective film includes a substrate layer (10) and a flexible layer (20) laminated on the substrate layer (10). The flexible layer (20) is formed after a liquid-phase flexible material is laminated on a surface of the substrate layer (10) through solidification. The flexible layer (20) of the flexible protective film is directly formed on the substrate layer (10) to reduce internal stress of the flexible protective film, thereby increasing an adhesive force of the flexible protective film.

19 Claims, 5 Drawing Sheets

(56) References Cited

U.S. PATENT DOCUMENTS

2017/0081488 A1    3/2017  Eveson et al.

FOREIGN PATENT DOCUMENTS

| | | |
|---|---|---|
| CN | 205439382 U | 8/2016 |
| CN | 106104410 A | 11/2016 |
| CN | 205812114 U | 12/2016 |
| CN | 106459460 A | 2/2017 |
| CN | 107267081 A | 10/2017 |
| CN | 107329527 A | 11/2017 |
| CN | 107384235 A | 11/2017 |
| CN | 107678587 A | 2/2018 |
| CN | 207091341 U | 3/2018 |
| CN | 107976725 A | 5/2018 |
| CN | 108329861 A | 7/2018 |
| CN | 207736901 U | 8/2018 |
| EP | 3228675 A1 | 10/2017 |
| TW | 201829566 A | 8/2018 |
| WO | 2018005833 A2 | 1/2018 |

* cited by examiner

FLEXIBLE PROTECTIVE FILM, CURVED DISPLAY, AND TERMINAL

CROSS-REFERENCE TO RELATED APPLICATIONS

This application is a national stage of International Application No. PCT/CN2018/103644, filed on Aug. 31, 2018, which is hereby incorporated by reference in its entirety.

TECHNICAL FIELD

The application relates to the field of protective film technologies, and in particular, to a flexible protective film used for a curved display, the curved display, and a terminal.

BACKGROUND

With screen evolution of electronic products such as terminal products including a mobile phone, a tablet computer, and the like, for example, with design of an ultra-large display and a curved display, an optical protective film has become an indispensable auxiliary product for these electronic products. The optical protective film can be used to protect a screen of a mobile phone from scratches, dust, and the like regardless of whether the mobile phone is used before delivery or usually used. The optical protective film generally is of a multilayer structure and is formed through adhesion by using an optical adhesive or the like. However, an optical adhesive layer may generate relatively large internal stress. Consequently, thermal dimensional stability of the optical protective film is affected.

SUMMARY

Embodiments of the application provide a flexible protective film, to resolve a technical problem that an existing protective film is unstably attached due to relatively large internal stress.

The application protects a flexible protective film. The flexible protective film is used to protect a curved display and can be attached with a curved-surface shape of the curved display. The flexible protective film includes a substrate layer and a flexible layer laminated on the substrate layer. The flexible layer is formed after a liquid-phase flexible material is laminated on a surface of the substrate layer through solidification. The flexible layer of the flexible protective film is directly formed on the substrate layer instead of being attached through adhesion by using an optical adhesive or the like. This can prevent an optical adhesive layer from generating relatively large internal stress between the substrate layer and the flexible layer, and avoid impact on attachment flexibility of the flexible layer, thereby ensuring attachment performance and attachment stability of the flexible protective film.

The flexible layer is formed in a coating manner or a deposition manner. The coating manner means coating a liquid-phase-state flexible material on the surface of the substrate layer through roller painting or spraying, and then performing solidification through heating, baking, or the like to increase hardness of a flexible material layer, so as to form the flexible layer. The deposition manner includes physical deposition or chemical deposition, and means physically or chemically processing a gaseous substance to form a liquid-phase-state flexible material layer through deposition on the surface of the substrate layer, and then performing solidification to form the flexible layer. Herein, "liquid-phase" means a liquid state or a state between a liquid state and a solid state.

A connection interface between the substrate layer and the flexible layer is a curved surface. Several concave parts and convex parts are formed on the surface of the substrate layer, in other words, surface roughening processing is performed, to form a rough curved surface. When the flexible layer covers the surface in a liquid state, each concave part is filled in, so that the connection interface between the substrate layer and the flexible layer is a curved surface, thereby increasing a binding force between the flexible layer and the substrate layer.

The flexible protective film includes a middle area and two side areas, the two side areas are respectively located on two opposite sides of the middle area and connected to the middle area by using bending areas, a thickness of the bending area is less than a thickness of the middle area, and the bending area is used to be attached to a curved-surface position of the curved display when the flexible protective film is adhered to the curved display. Because the thickness of the bending area is relatively small, bending stress is reduced, so that attachment performance of the flexible protective film is further improved.

The flexible protective film includes a middle area and two side areas, the two side areas are formed after two opposite sides of the middle area bend and extend, and a connection part between each side area and the middle area is an arc surface. The two side areas of the flexible protective film are directly shaped into a bent state. Therefore, when the flexible protective film is adhered to the curved display, the two side areas do not need to be bent, so that no bending stress is generated, thereby ensuring an attachment effect. In addition, a size of the entire flexible protective film is designed based on some standard models of curved displays during production, thereby increasing a degree of matching with the curved display and film attachment efficiency.

A material of the substrate layer is polyethylene terephthalate (PET), polycarbonate (PC), or polymethyl methacrylate (PMMA); and a material of the flexible layer is thermoplastic polyurethane (TPU) or polyurethane. The substrate layer can increase hardness and smoothness of the entire flexible protective film, and enhance surface anti-damage strength. The flexible layer provides enough flexibility and attachment stability for the flexible protective film.

The flexible protective film has two flexible layers respectively laminated on two opposite surfaces of the substrate layer. The two flexible layers are disposed and are directly formed on the substrate layer, so that flexibility and hardness can be ensured.

The flexible protective film includes an out-light surface and a PET layer, and the PET layer is laminated on the out-light surface of the flexible protective film. The out-light surface may be a surface that is of the substrate layer and that is away from the flexible layer, or may be a surface that is of the flexible layer and that is away from the substrate layer. Certainly, when there are two flexible layers, the out-light surface is a surface of one flexible layer.

The flexible protective film includes an out-light surface, and the out-light surface is provided with a hardening layer and/or an anti-fingerprint processing layer. The out-light surface may be a surface that is of the substrate layer and that is away from the flexible layer, or may be a surface that is away from the flexible layer and that is away from the substrate layer. Certainly, when there are two flexible layers, the out-light surface is a surface of one flexible layer. The hardening layer is formed through surface hardening processing, or may be adhered to the out-light surface by using an optical adhesive. The anti-fingerprint processing is disposed on the out-light surface, to prevent a finger from scratching a screen during an operation on the screen.

An adhesive layer and a release film layer that covers the adhesive layer are laminated on a surface that is of the flexible layer and that is opposite to the substrate layer, and the adhesive layer is used to adhere the flexible protective film to the curved display after the release film is removed. The release film layer is used to protect the adhesive layer when the flexible protective film is not used. The adhesive layer is acrylic adhesive, silica gel, or a mixture thereof.

The flexible protective film further includes an outer protective layer, and the outer protective layer is used to protect a surface that is of the flexible protective film and that is operated as the curved display. The outer protective layer is disposed on an outer surface of the flexible protective film. With reference to the foregoing embodiments, the outer protective layer may be disposed on a surface of the substrate layer or a surface of the flexible layer, or when there is a PET layer, the outer protective layer is disposed on a surface of the PET layer, to prevent the outer surface of the flexible protective film from being scratched.

The application further protects a curved display, including a display surface and the foregoing flexible protective film. A substrate layer or a flexible layer of the flexible protective film is adhered to the display surface. The curved display is a 3D or 2.5D curved display. The flexible protective film is adhered to the display surface to protect the display from being damaged. Because internal stress of the flexible protective film is relatively small, a force of attachment with the curved display is ensured, an edge of the flexible protective film is prevented from tilting, and enough hardness is also ensured.

The display surface of the curved display includes a middle display area and edge display areas that are located on two opposite sides of the middle display area and that are connected to the middle display area by using curved-surface areas, a bending area of the flexible protective film is attached to the curved-surface area, the side area is attached to the edge display area, and the middle area is attached to the middle display area. When the flexible protective film is attached to a curved-surface position, bending stress of the bending area is smaller, so that the bending area of the flexible protective film can be attached to a curved surface of the curved display more closely.

The application further protects a terminal, including a terminal body and the foregoing curved display. The curved display is disposed on the terminal body and provides power and display control through the terminal body. A flexible protective film is disposed on the curved display, to prevent the display from being damaged in a transportation process or in a use process, thereby ensuring appearance quality of the terminal.

The flexible protective film provided in the application is used to protect the curved display, and the flexible layer is directly formed on the substrate layer to reduce internal stress of the flexible protective film, thereby increasing an adhesive force of the flexible protective film, and ensuring stability attachment between the flexible protective film and the curved display.

DESCRIPTION OF EMBODIMENTS

The following clearly and completely describes the technical solutions in embodiments of the application with reference to the accompanying drawings.

The application protects a flexible protective film. The flexible protective film is used to protect a curved display and can be attached with a curved-surface shape of the curved display. The flexible protective film is mainly used to protect a screen of a terminal with a curved display such as a mobile phone or a tablet computer in a use process or before delivery. The flexible protective film has a specific hardness, and can effectively prevent a middle flat display area of the curved display from being scratched or damaged. In addition, the flexible protective film has a relatively stable force of attachment, to ensure use stability.

The flexible protective film includes a substrate layer and a flexible layer laminated on the substrate layer. The flexible layer is formed after a liquid-phase flexible material is laminated on a surface of the substrate layer through solidification. The flexible layer of the flexible protective film is directly formed on the substrate layer instead of being attached through adhesion by using an optical adhesive or the like. This can prevent an optical adhesive layer from generating relatively large internal stress between the substrate layer and the flexible layer, and avoid impact on attachment flexibility of the flexible layer, thereby ensuring attachment performance and attachment stability of the flexible protective film.

The following describes embodiments of the flexible protective film and the terminal.

Figure 1:
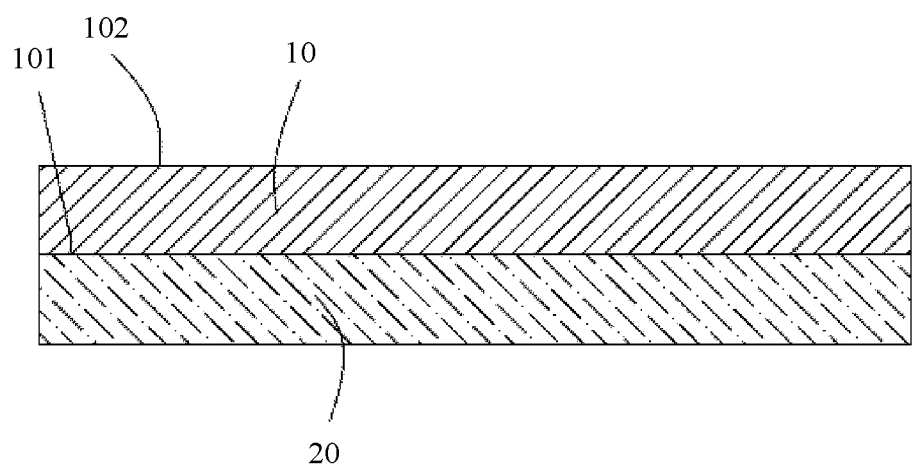
FIG. 1 is a schematic sectional view of a first embodiment of a flexible protective film according to the application.

Referring to FIG. 1, in a first embodiment of a flexible protective film in the application, the flexible protective film includes a substrate layer 10 and a flexible layer 20 laminated on the substrate layer 10. The flexible layer 20 is formed after a liquid-phase flexible material is laminated on a surface of the substrate layer 10 through solidification. The substrate layer 10 includes a first surface 101 and a second surface 102 opposite to the first surface 101. In an embodiment, the second surface 102 is an out-light surface of the flexible protective film, and the flexible layer 20 is formed on the first surface 101. Herein, "liquid-phase" means that a flexible material is in a liquid state or a state between a liquid state and a solid state, and "solidification" means that a liquid-phase object is solidified into a solid state. A material of the substrate layer is PET, PC, or PMMA; and a material of the flexible layer is TPU or polyurethane. The substrate layer can increase hardness and smoothness of the entire flexible protective film, and enhance surface anti-damage strength. The flexible layer provides enough flexibility and attachment stability for the flexible protective film. Certainly, the substrate layer and the flexible layer may alternatively be made from other materials that are applicable to a thin film and that have same performance as the PET and the TPU, which are not limited to the PET and the TPU.

Further, the flexible layer 20 is formed in a coating manner or a deposition manner. The coating manner means coating a liquid-state flexible material on the surface of the substrate layer through roller painting or spraying, and then performing solidification to increase hardness of a flexible material layer, so as to form the flexible layer. The deposition manner includes physical deposition or chemical deposition, and means physically or chemically processing a gaseous substance to form a liquid-phase-state flexible material layer through deposition on the surface of the substrate layer, and then performing solidification to form the flexible layer. In an embodiment, the flexible layer 20 is formed on the first surface 101 of the substrate layer 20 in the coating manner. The flexible layer 20 is directly formed on the surface of the substrate layer 10 in the two manners instead of being attached through adhesion by using an optical adhesive or the like. This can prevent an optical adhesive layer from generating relatively large internal stress between the substrate layer 10 and the flexible layer 20, thereby ensuring attachment performance of the flexible protective film.

Figure 2:
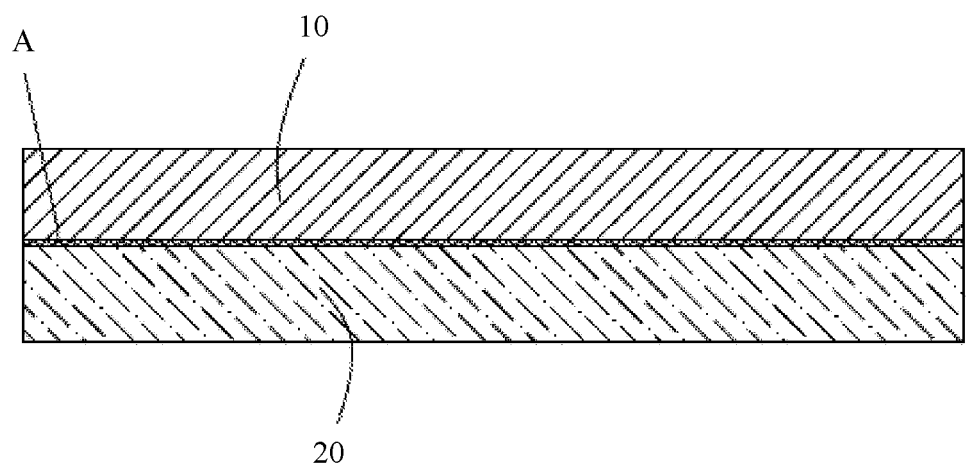
FIG. 2 is a schematic sectional view in which the flexible protective film shown in FIG. 1 has a curved connection interface according to an embodiment of the application.

Further, referring to FIG. 2, a connection interface A between the substrate layer 10 and the flexible layer 20 is a curved surface or a flat surface. That the connection interface A is a flat surface means that the connection interface A is a smooth connection interface. Alternatively, when the connection interface A is a curved surface, surface roughening processing is performed, in other words, several concave parts and convex parts are formed on the surface of the substrate layer 10, to form a rough curved surface. When the flexible layer 20 covers the surface in a liquid phase state, each concave part may be filled in, so that the connection interface A between the substrate layer 10 and the flexible layer 20 is a curved surface, thereby increasing a binding force between the flexible layer 20 and the substrate layer 10. That several concave parts and convex parts are formed on the surface of the substrate layer 10 can be implemented by performing roughening processing on the surface of the substrate layer 10. The surface described herein is the first surface 101.

Figure 3:
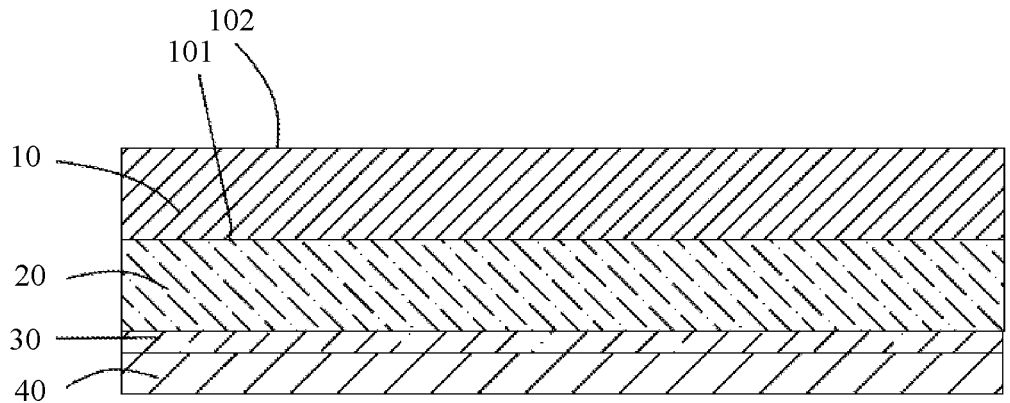
FIG. 3 is a schematic sectional view in which the flexible protective film shown in FIG. 1 includes an adhesive layer and a release film layer according to an embodiment of the application.

Further, referring to FIG. 3, an adhesive layer 30 and a release film layer 40 that covers the adhesive layer 30 are laminated on a surface that is of the flexible layer 20 and that is opposite to the substrate layer 10, and the adhesive layer 30 is used to adhere the flexible protective film to the curved display after the release film 40 is removed. The substrate layer 10, the flexible layer 20, and the adhesive layer 30 constitute a use function layer of the flexible protective film. The out-light surface of the flexible protective film and the adhesive layer 30 are located on two opposite sides of the flexible protective film. The release film layer 40 is used to protect the adhesive layer 30 when the flexible protective film is not used. The adhesive layer 30 is acrylic adhesive, silica gel, or a mixture thereof.

Figure 4:
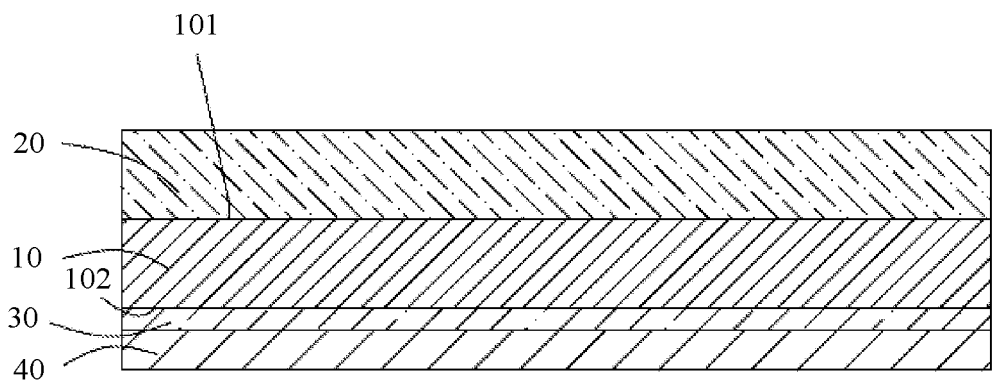
FIG. 4 is a schematic sectional view of a second embodiment of a flexible protective film according to the application.

Referring to FIG. 4, in a second embodiment of the application, a difference from the foregoing embodiment is: The flexible layer 20 is formed on the second surface 102 of the substrate layer. The flexible layer 20 is formed on the second surface 102 of the substrate layer 20 in a coating manner, the adhesive layer 30 is disposed on the first surface 101 of the substrate layer 10, and a surface that is of the flexible layer 20 and that is opposite to the adhesive layer 30 is the out-light surface of the flexible film. In an embodiment, the flexible layer 20 is used as an outer layer of the flexible protective film, so that an effect of ensuring the attachment stability can also be achieved.

Figure 5:
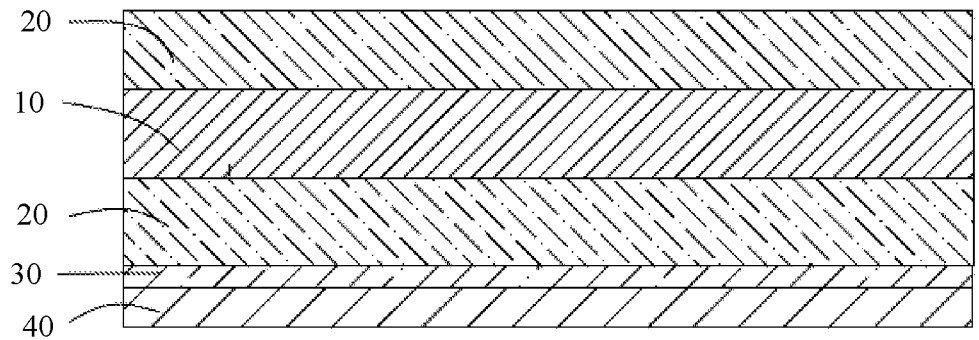
FIG. 5 is a schematic sectional view of a third embodiment of a flexible protective film according to the application.

Referring to FIG. 5, in a third embodiment of the application, a difference from the first embodiment is: The flexible protective film has two flexible layers 20 respectively laminated on two opposite surfaces of the substrate layer 10. The two flexible layers are disposed and are directly formed on the substrate layer, thereby ensuring flexibility and overall stiffness. In an embodiment, the two flexible layers 20 are respectively laminated on the first surface 101 and the second surface 102, and a surface of the flexible layer 20 located on the second surface 102 is still used as the out-light surface of the flexible protective film. The adhesive layer 30 is laminated on a surface that is of the flexible layer 20 located on the first surface 101 and that is opposite to the substrate layer 10.

Figure 6:
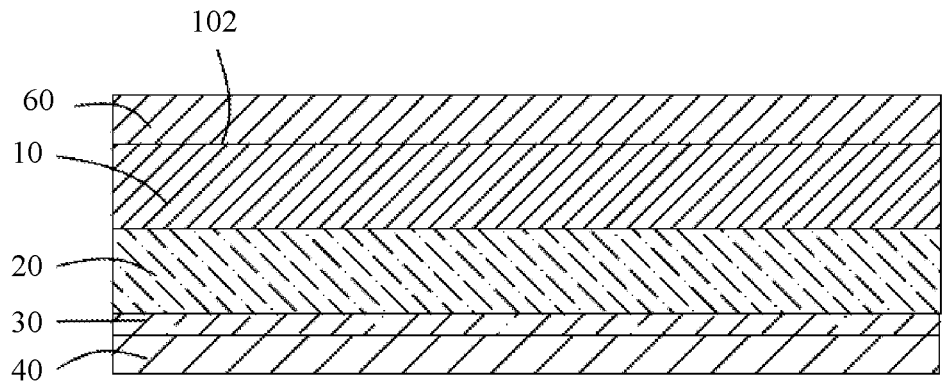
FIG. 6 is a schematic sectional view of a fourth embodiment of a flexible protective film according to the application.

Referring to FIG. 6, on a basis of the first embodiment to the third embodiment of the application, in a fourth embodiment of the application, the flexible protective film includes a PET layer 60, and the PET layer is laminated on the out-light surface of the flexible protective film, thereby increasing hardness of the flexible protective film. The out-light surface may be a surface that is of the substrate layer 10 and that is away from the flexible layer 20, that is, the second surface 102 in the first embodiment. Alternatively, the out-light surface may be a surface that is of the flexible layer 20 and that is away from the substrate layer 10, that is, a surface of the flexible layer 20 in the second embodiment. Certainly, when there are two flexible layers 20, the out-light surface is a surface of one flexible layer 20, that is, a surface away from the adhesive layer 30. In an embodiment, on a basis of the first embodiment, the PET layer 60 is adhered to the second surface 102 of the substrate layer 10 by using acrylic acid or silica gel. In the foregoing embodiments, the added flexible layer or PET layer belongs to a layer structure of a use layer.

Figure 7:
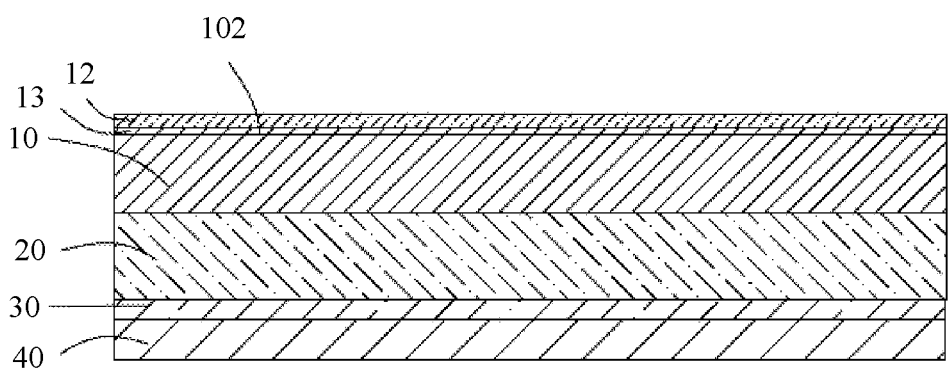
FIG. 7 is a schematic sectional view in which a flexible protective film is provided with a hardening layer and an anti-fingerprint processing layer according to the application, where an embodiment is based on the flexible protective film shown in FIG. 3.

Further, referring to FIG. 7, in any one of the foregoing embodiments, the out-light surface of the flexible protective film is provided with a hardening layer and/or an anti-fingerprint processing layer. The out-light surface may be a surface that is of the substrate layer 10 and that is away from the flexible layer 20, that is, the second surface 102 in the first embodiment. Alternatively, the out-light surface may be a surface that is of the flexible layer 20 and that is away from the substrate layer 10, that is, a surface of the flexible layer 20 in the second embodiment. Certainly, when there are two flexible layers 20, the out-light surface is a surface of one flexible layer 20, that is, a surface away from the adhesive layer 30. The hardening layer is formed through surface hardening processing, or may be adhered to the out-light surface by using an optical adhesive. The anti-fingerprint processing is disposed on the out-light surface, to prevent a finger from scratching a screen during an operation on the screen. In an embodiment, on a basis of the first embodiment, the out-light surface of the flexible protective film is provided with an anti-fingerprint processing layer 12 and a hardening layer 13. The hardening layer 13 can increase hardness and improve anti-damage performance of an outer surface of the flexible protective film. The anti-fingerprint processing layer 12 can prevent use and appearance aesthetics of a screen from being affected when a fingerprint exists on the flexible protective film during use.

Figure 8:
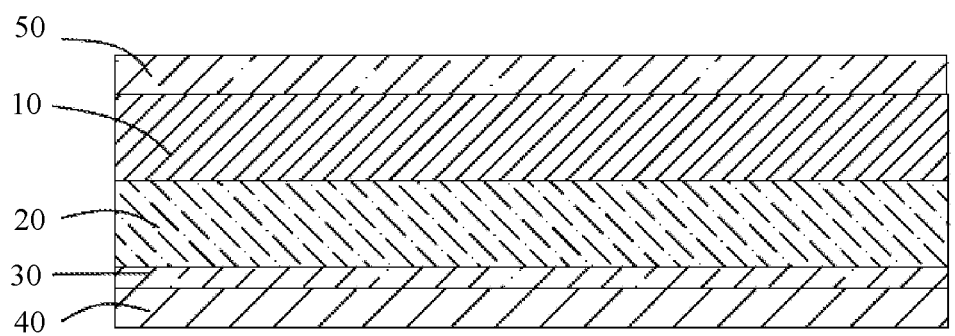
FIG. 8 is a schematic sectional view in which a flexible protective film has an outer protective layer according to the application, where an embodiment is based on the flexible protective film shown in FIG. 3.

The flexible protective film further includes an outer protective layer. The outer protective layer is used to protect a surface that is of the flexible protective film and that is operated as a curved display, and the outer protective layer is disposed on an outer surface of the flexible protective film. With reference to the foregoing embodiments, referring to FIG. 8, an embodiment is described on a basis of the embodiment of the flexible protective film shown in FIG. 3. An outer protective layer 50 is disposed on the second surface 102 of the substrate layer 10, and is used to prevent an outer surface of the flexible protective film from being scratched. It may be understood that the flexible protective film according to any one of the foregoing embodiments has an even overall thickness and is relatively smooth.

Figure 9:
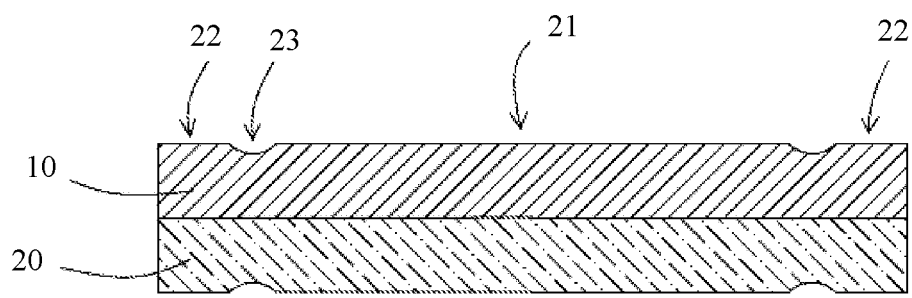
FIG. 9 is a schematic sectional view of a fifth embodiment of a flexible protective film according to the application.

FIG. 9 shows a fifth embodiment of a flexible protective film according to the application, and may be on a basis of any one of the foregoing embodiments. In other words, the technical solution in an embodiment may be applied to any one of the foregoing embodiments. In an embodiment, the flexible protective film shown in FIG. 1 is used as a basis for description, and FIG. 9 is a schematic diagram. The flexible protective film includes a middle area 21 and two side areas 22, the two side areas 22 are respectively located on two opposite sides of the middle area 21 and connected to the middle area 21 by using bending areas 23, and a thickness of the bending area 23 is less than a thickness of the middle area 21, and is also less than a thickness of the side area 22 in an embodiment. The bending area 23 is used to be attached to a curved-surface position of the curved display when the flexible protective film is adhered to the curved display. Because the thickness of the bending area 23 is relatively small, bending stress is reduced, so that attachment performance of the flexible protective film can be improved when the flexible protective film is attached to an uneven area of the curved display, thereby avoiding unstable attachment.

In an embodiment, the middle area 21 and the side area 22 are divided in an extension direction of the flexible protective film. The substrate layer 10, the flexible layer 20, the adhesive layer 30, the release film layer 40, and/or the outer protective layer 50 included in the flexible protective film in an embodiment are/is arranged in a direction perpendicular to the flexible protective film. Therefore, the middle area 21 and the side area 22 include the substrate layer 10 and the flexible layer 20. In other words, that the thickness of the bending area 23 is less than the thickness of the middle area 21 means that a thickness of an area including at least the substrate layer 10 and the flexible layer 20 in the bending area 23 is less than a thickness of another area. Certainly, thicknesses of the adhesive layer 30 and the PET layer 60 of the flexible protective film 20 in an embodiment may also be reduced with a position of the bending area 23. The thickness of the bending area 23 of the flexible protective film shown in an embodiment is reduced on two opposite surfaces of the flexible protective film. However, in another implementation, flatness of an out-light surface may be maintained, so that the thickness of the flexible protective film is reduced in a direction from the adhesive layer 30 to the out-light surface, in other words, height differences are generated only between the adhesive layer 30 and the middle area 21 as well as the side areas 22.

Figure 10:
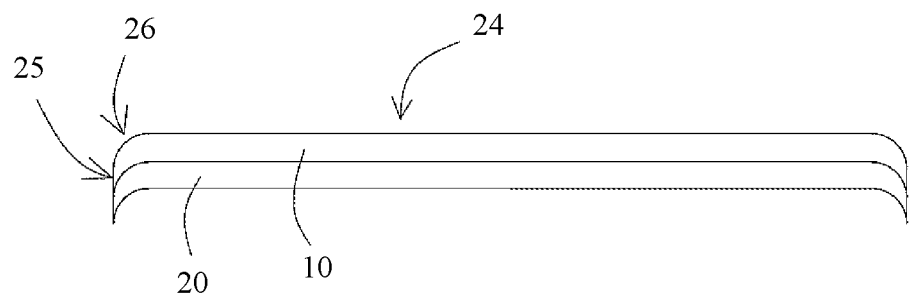
FIG. 10 is a schematic sectional view of a sixth embodiment of a flexible protective film according to the application.

Referring to FIG. 10, in a sixth embodiment of the application, the flexible protective film includes a middle area 24 and two side areas 25, the two side areas 25 are formed after two opposite sides of the middle area 24 bend and extend, and a connection part 26 between each side area 25 and the middle area 24 is an arc surface. The two side areas 25 of the flexible protective film are directly shaped into a bent state. Therefore, when the flexible protective film is adhered to the curved display, the two side areas do not need to be bent, so that no bending stress is generated, thereby ensuring an attachment effect. In addition, a size of the entire flexible protective film is designed based on some standard models of curved displays during production, thereby increasing a degree of matching with the curved display and film attachment efficiency. In an embodiment, the connection part 26 is of an arc-shaped structure that fits a curved-surface structure of a general curved display, or certainly may be of another form, which is not limited to an arc, to fit different forms of curved surfaces of the curved display.

For example, the flexible protective film 20 in an embodiment is the flexible protective film shown in FIG. 3. In an embodiment, the middle area 21 and the side area 22 are divided in an extension direction of the flexible protective film, and the substrate layer 10, the flexible layer 20, the adhesive layer 30, the release film layer 40, and/or the outer protective layer 50 included in the flexible protective film in an embodiment are/is arranged in a direction perpendicular to the flexible protective film. Therefore, the middle area 21 and the side area 22 include at least the substrate layer 10, the flexible layer 20, and the adhesive layer 30. The release film layer 40, the outer protective layer 50, or the PET layer 60 on the flexible protective film changes with a shape of the flexible protective film.

Figure 11:
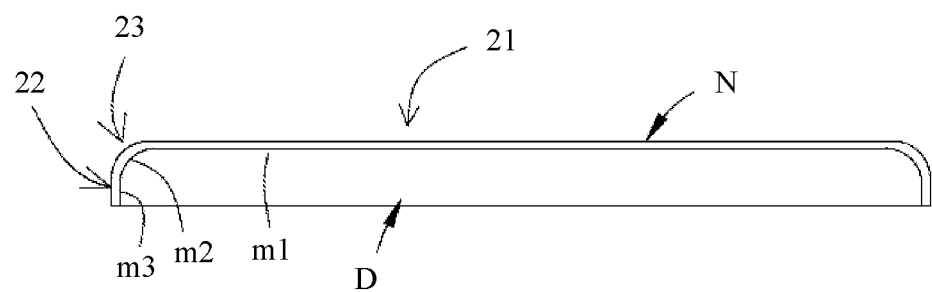
FIG. 11 is a brief schematic diagram of a curved display having a flexible protective film according to an embodiment of the application.

Referring to FIG. 11, the application further protects a curved display D, including a display surface and the flexible protective film N. The flexible protective film N may be a protective film according to any one of the foregoing embodiments. In an embodiment, the flexible protective film shown in FIG. 3 is used as an example, and the substrate layer 10 or the flexible protective film 20 of the flexible protective film is adhered on the display surface. The curved display is a 3D curved display. The flexible protective film is adhered to the display surface and is attached with a shape of the display surface of the curved display, to protect the display screen from being damaged. Because internal stress of the flexible protective film is relatively small, a force of attachment with the curved display is ensured, an edge of the flexible protective film is prevented from tilting, and enough hardness is also ensured the flexible protective film.

In an embodiment, the display surface of the curved display includes a middle display area m1 and edge display areas m3 that are located on two opposite sides of the middle display area m1 and that are connected to the middle display area m1 by using curved-surface areas m2. The bending area 23 of the flexible protective film is attached to the curved-surface area m2, the side area 22 is attached to the edge display area m3, and the middle area 21 is attached to the middle display area m1. When the flexible protective film is attached to the curved-surface area m2, bending stress of the bending area 23 is smaller, so that the bending area 23 of the flexible protective film can be attached to the curved-surface area m2 more closely.

Figure 12:
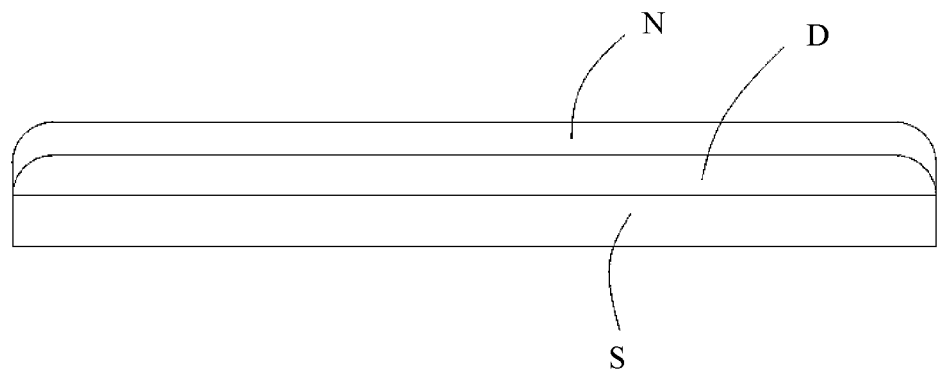
FIG. 12 is a brief schematic diagram of a terminal having the curved display according to an embodiment of the application, where a front view is used as an example.

Referring to FIG. 12, the application further protects a terminal, including a terminal body S and the foregoing curved display D. The curved display D is disposed on the terminal body S and provides power and display control through the terminal body S. A flexible protective film N is disposed on the curved display, to prevent the display from being damaged in a transportation process or in a use process, thereby ensuring appearance quality of the terminal. The flexible protective film N is a protective film according to any one of the embodiments of the application. The flexible protective film used in FIG. 12 is a protective film obtained after the release film layer is removed in FIG. 3. The flexible protective film N may be adhered to the curved display D of the terminal when the terminal is delivered from a factory. Certainly, in this case, the flexible protective film does not include the release film layer. Alternatively, the flexible protective film may be adhered to the terminal when a user uses the terminal. The terminal in an embodiment is a 3D curved phone.

The foregoing descriptions are example implementations of the embodiments of the application. It should be noted that one of ordinary skill in the art may make several improvements or polishing without departing from the principle of embodiments of the application, and the improvements or polishing shall fall within the protection scope of embodiments of the application.

What is claimed is:

1. A flexible protective film to protect a curved display, comprising:
    a substrate layer; and
        a flexible layer laminated on the substrate layer, wherein the flexible layer is formed after a liquid-phase flexible material is laminated on a surface of the substrate layer through solidification, wherein the flexible layer is directedly formed on the substrate layer, wherein the flexible protective film comprises an out-light surface and a polyethylene terephthalate (PET) layer, and the PET layer is laminated on the out-light surface of the flexible protective film.

2. The flexible protective film according to claim 1, wherein the flexible layer is formed in a coating manner or a deposition manner.

3. The flexible protective film according to claim 1, wherein a connection interface between the substrate layer and the flexible layer is a flat surface or a curved surface.

4. The flexible protective film according to claim 1, further comprising:
    a middle area; and
    two side areas, wherein the two side areas are respectively located on two opposite sides of the middle area and connected to the middle area by using bending areas, wherein a thickness of the bending area is less than a thickness of the middle area, and the bending area is used to be attached to a curved-surface position of the curved display when the flexible protective film is adhered to the curved display.

5. The flexible protective film according to claim 1, further comprising:
    a middle area; and
    two side areas, wherein the two side areas are formed after two opposite sides of the middle area are bent and extended, and a connection part between each side area and the middle area is an arc surface.

6. The flexible protective film according to claim 1, wherein a material of the substrate layer is polyethylene terephthalate (PET), polycarbonate (PC), or polymethyl methacrylate (PMMA); and a material of the flexible layer is thermoplastic polyurethane (TPU) or polyurethane.

7. The flexible protective film according to claim 1, wherein the flexible protective film has two flexible layers respectively laminated on two opposite surfaces of the substrate layer.

8. The flexible protective film according to claim 1, wherein the out-light surface is provided with a hardening layer, an anti-fingerprint processing layer, or a combination thereof.

9. The flexible protective film according to claim 1, wherein an adhesive layer and a release film layer that covers the adhesive layer are laminated on a surface of the flexible layer that is opposite to the substrate layer, and the adhesive layer is used to adhere the flexible protective film to the curved display after the release film is removed.

10. The flexible protective film according to claim 1, wherein the flexible protective film further comprises:
    an outer protective layer, wherein the outer protective layer is used to protect a surface of the flexible protective film that is operated as the curved display.

11. A curved display, comprising:
    a display surface; and
    a flexible protective film, wherein the flexible protective film is used to protect a curved display and comprises:
        a substrate layer; and
        a flexible layer laminated on the substrate layer, wherein the flexible layer is formed after a liquid-phase flexible material is laminated on a surface of the substrate layer through solidification, wherein the flexible layer is directedly formed on the substrate layer; and
    wherein the substrate layer or the flexible layer of the flexible protective film is adhered to the display surface, wherein the flexible protective film comprises an out-light surface and a polyethylene terephthalate (PET) layer, and the PET layer is laminated on the out-light surface of the flexible protective film.

12. The curved display according to claim 11, wherein the display surface of the curved display comprises:
    a middle display area; and
        edge display areas that are located on two opposite sides of the middle display area and that are connected to the middle display area by using curved-surface areas, wherein a bending area of the flexible protective film is attached to the curved-surface area, a side area is attached to the edge display area, and a middle area is attached to the middle display area.

13. A terminal, comprising:
    a terminal body; and
    a curved display, wherein the curved display comprises:
        a display surface; and
        a flexible protective film, wherein the flexible protective film is used to protect the curved display and comprises:
            a substrate layer; and
            a flexible layer laminated on the substrate layer, the flexible layer is formed after a liquid-phase flexible material is laminated on a surface of the substrate layer through solidification, wherein the flexible layer is directedly formed on the substrate layer;

wherein the substrate layer or the flexible layer of the flexible protective film is adhered to the display surface; and wherein the curved display is disposed on the terminal body and provides power and display control through the terminal body, wherein the flexible protective film comprises an out-light surface and a polyethylene terephthalate (PET) layer, and the PET layer is laminated on the out-light surface of the flexible protective film.

14. The terminal according to claim 13, wherein the flexible layer is formed in a coating manner or a deposition manner.

15. The terminal according to claim 13, wherein a connection interface between the substrate layer and the flexible layer is a flat surface or a curved surface.

16. The terminal according to claim 13, wherein the flexible protective film comprises:
   a middle area; and
   two side areas, wherein the two side areas are respectively located on two opposite sides of the middle area and connected to the middle area by using bending areas, wherein a thickness of the bending area is less than a thickness of the middle area, and the bending area is used to be attached to a curved-surface position of the curved display when the flexible protective film is adhered to the curved display.

17. The terminal according to claim 13, wherein the flexible protective film comprises a middle area and two side areas, wherein the two side areas are formed after two opposite sides of the middle area are bent and extended, and a connection part between each side area and the middle area is an arc surface.

18. The terminal according to claim 13, wherein a material of the substrate layer is polyethylene terephthalate (PET), polycarbonate (PC), or polymethyl methacrylate (PMMA); and a material of the flexible layer is thermoplastic polyurethane (TPU) or polyurethane.

19. The terminal according to claim 13, wherein the flexible protective film has two flexible layers respectively laminated on two opposite surfaces of the substrate layer.

* * * * *